Figure 1:
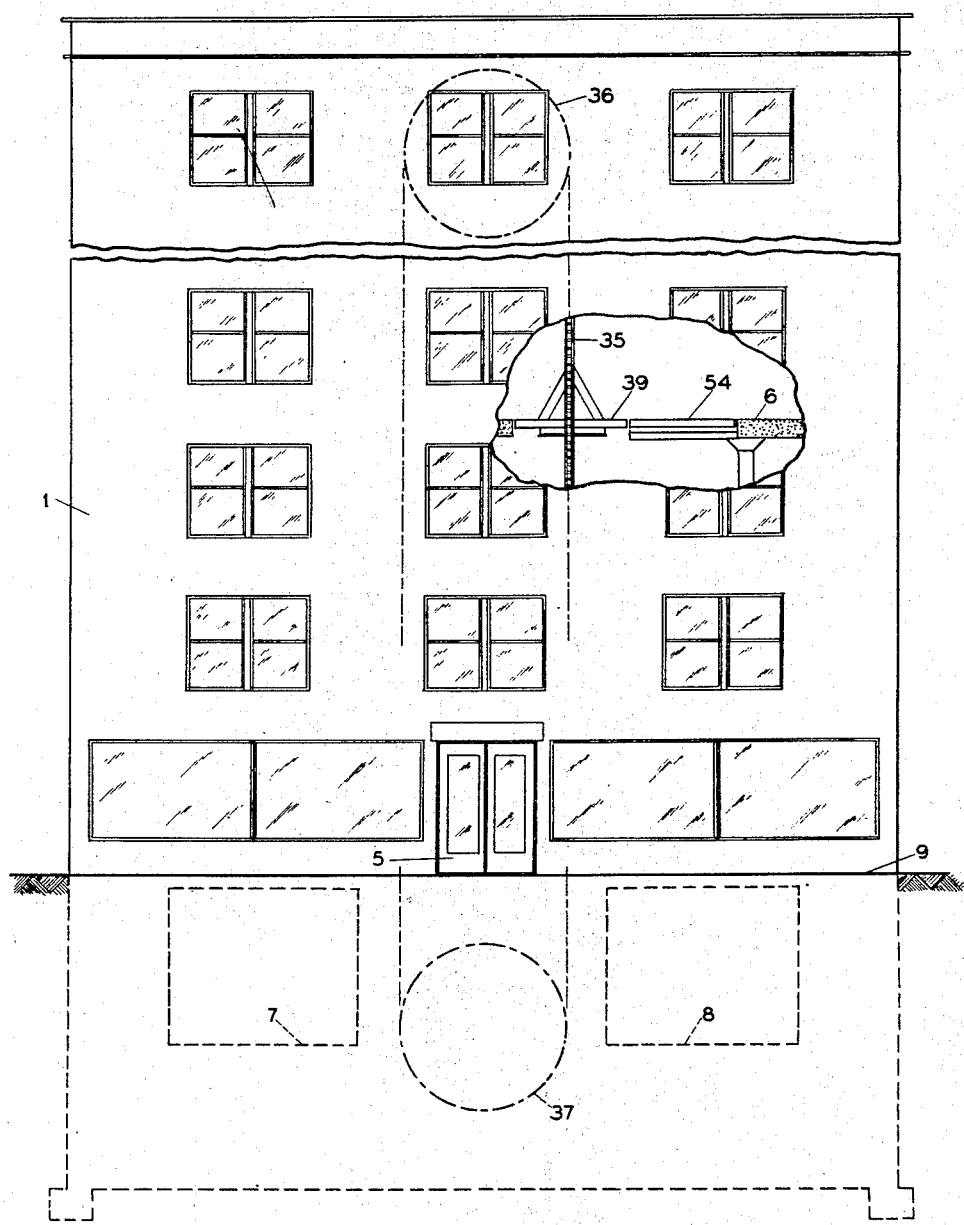

April 23, 1957 J. L. DESJARDINS 2,789,710
MECHANIZED PARKING GARAGE
Original Filed Aug. 30, 1948 13 Sheets-Sheet 1

INVENTOR.
JOSEPH L. DES JARDINS
BY
*Salvatore G. Militano,*
ATTORNEY

April 23, 1957     J. L. DESJARDINS     2,789,710
MECHANIZED PARKING GARAGE
Original Filed Aug. 30, 1948     13 Sheets-Sheet 2
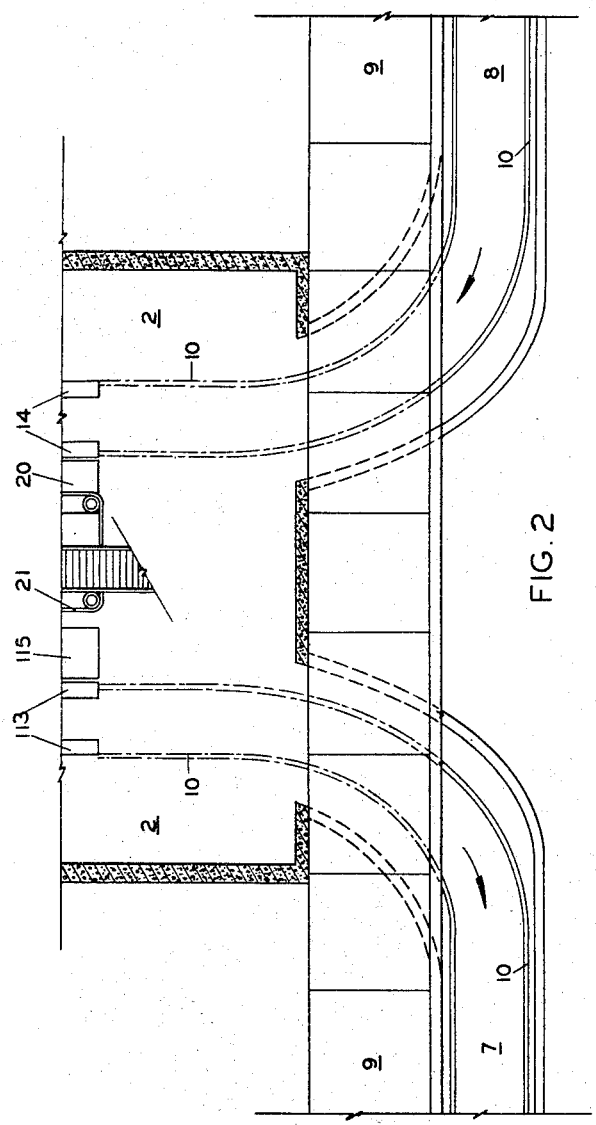
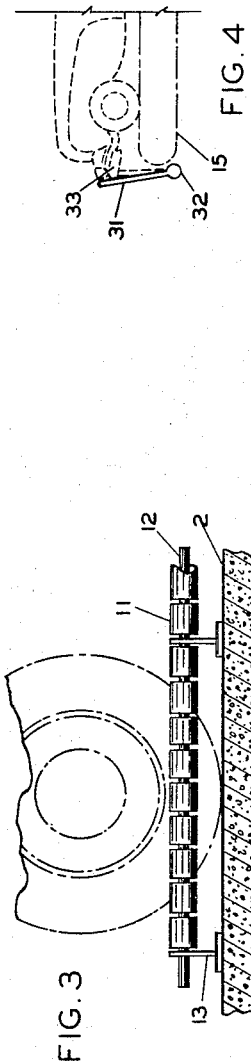
INVENTOR.
JOSEPH L. DES JARDINS
BY
ATTORNEY April 23, 1957     J. L. DESJARDINS     2,789,710
MECHANIZED PARKING GARAGE Original Filed Aug. 30, 1948     13 Sheets-Sheet 3

*INVENTOR.*
JOSEPH L. DES JARDINS
BY
*Salvatore G. Militano*
ATTORNEY

April 23, 1957   J. L. DESJARDINS   2,789,710
MECHANIZED PARKING GARAGE
Original Filed Aug. 30, 1948   13 Sheets-Sheet 4
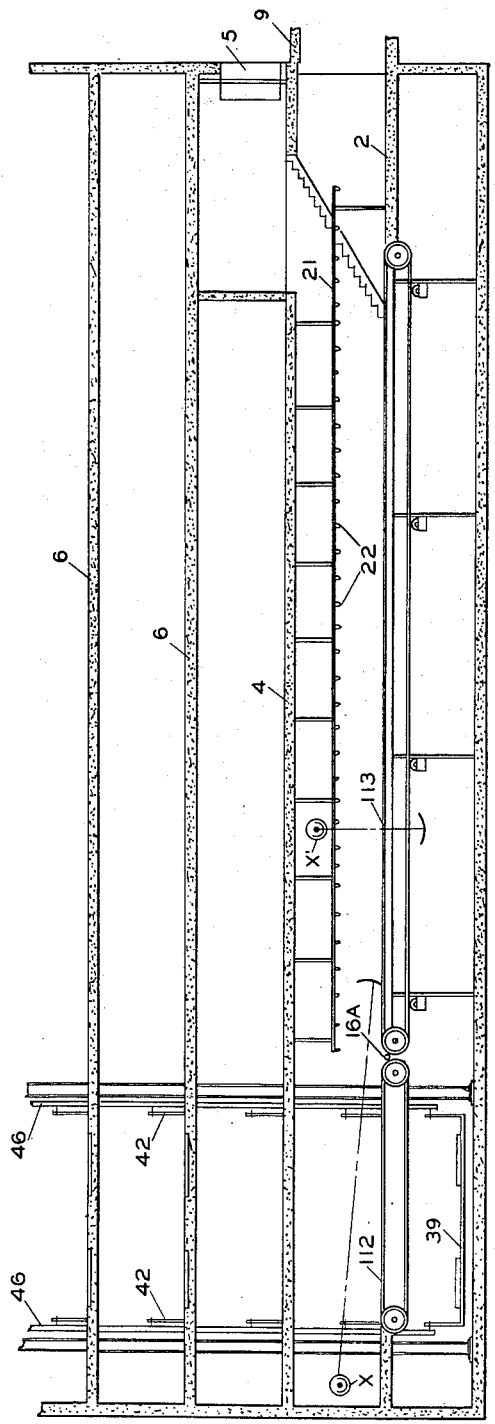
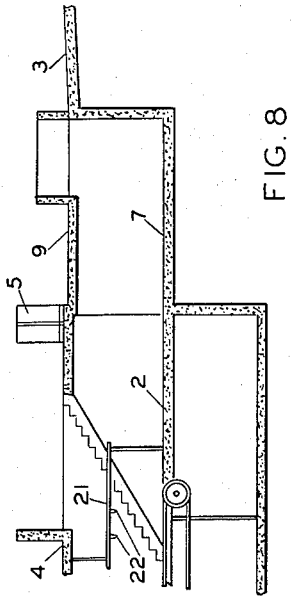
*INVENTOR.*
JOSEPH L. DES JARDINS
*BY*
ATTORNEY

INVENTOR.
JOSEPH L. DES JARDINS
BY
ATTORNEY

April 23, 1957  J. L. DESJARDINS  2,789,710
MECHANIZED PARKING GARAGE
Original Filed Aug. 30, 1948  13 Sheets-Sheet 6

INVENTOR.
JOSEPH L. DES JARDINS
BY
*Salvatore G. Militana,*
ATTORNEY

April 23, 1957     J. L. DESJARDINS     2,789,710
MECHANIZED PARKING GARAGE
Original Filed Aug. 30, 1948     13 Sheets-Sheet 7
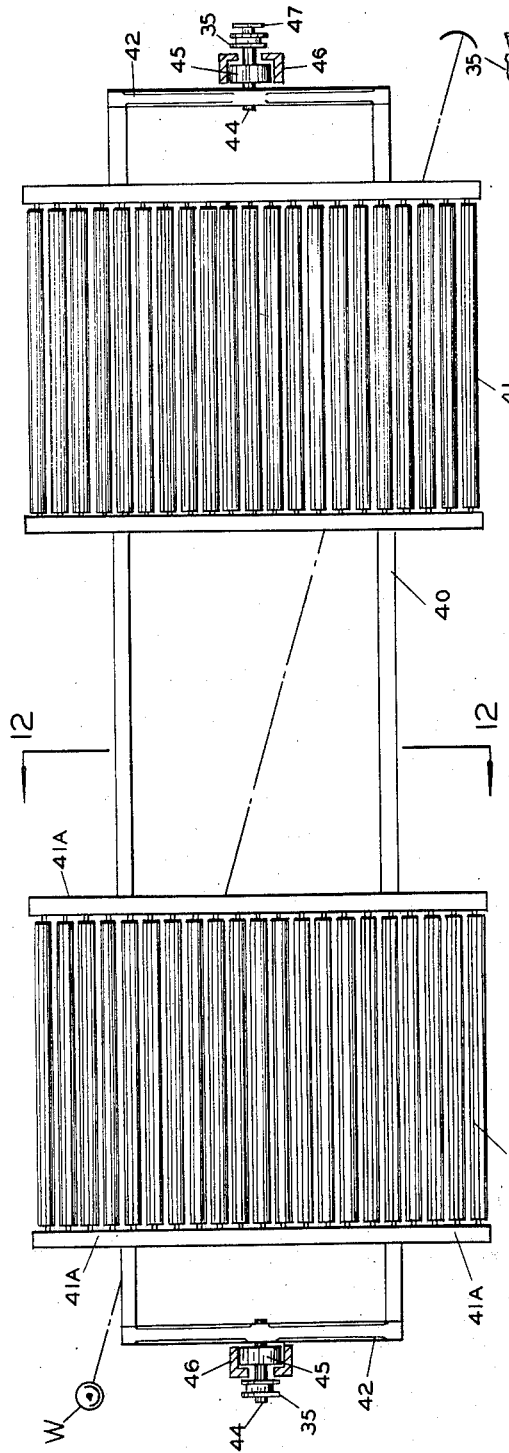
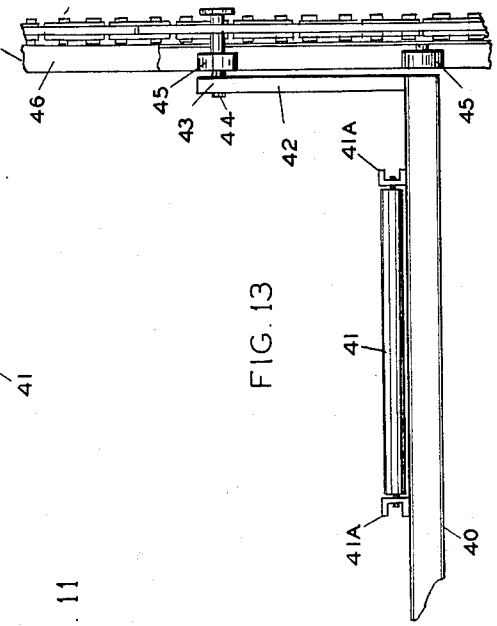
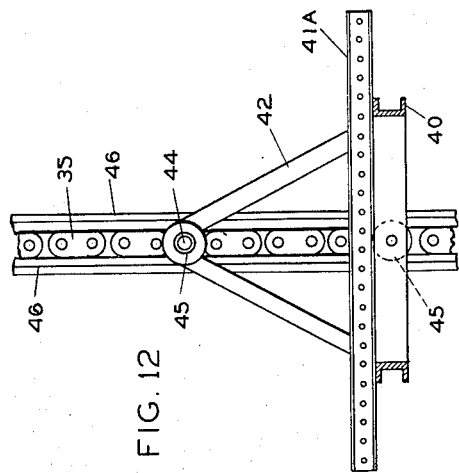
INVENTOR.
JOSEPH L. DES JARDINS
BY
ATTORNEY April 23, 1957 J. L. DESJARDINS 2,789,710
MECHANIZED PARKING GARAGE
Original Filed Aug. 30, 1948 13 Sheets-Sheet 8
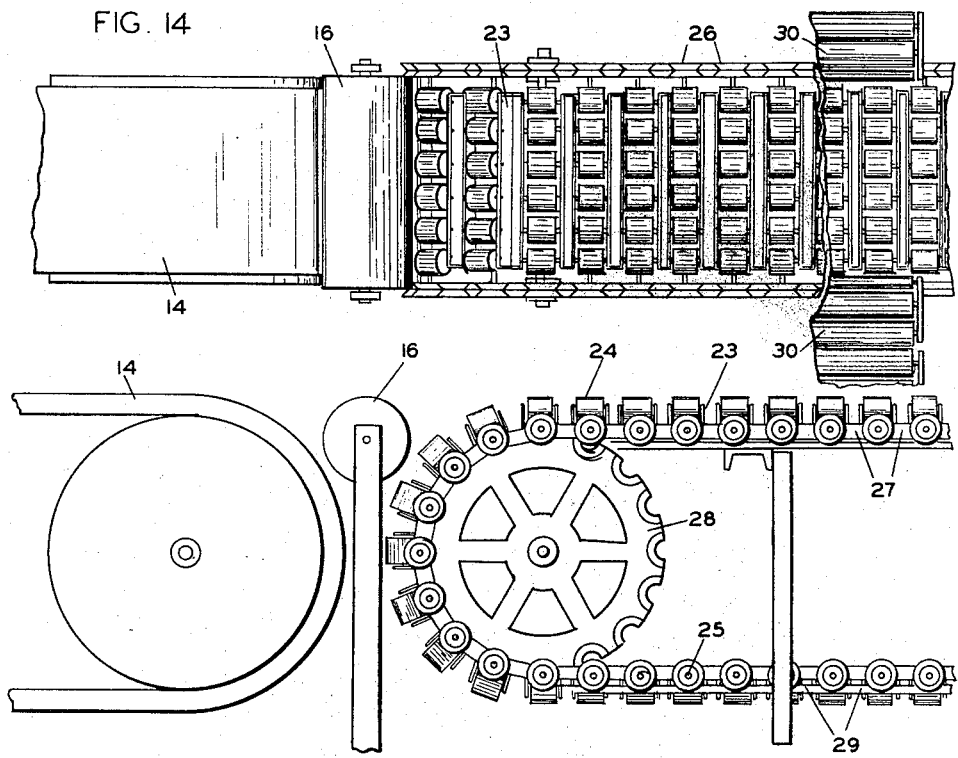
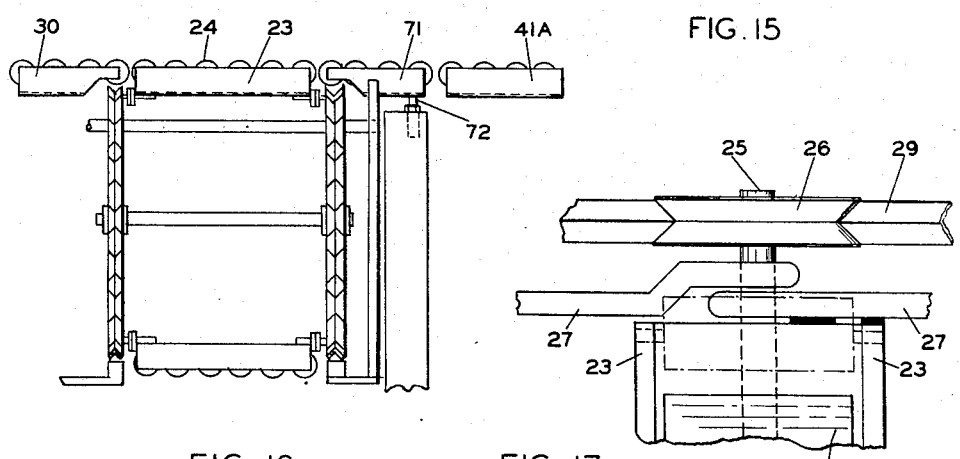
INVENTOR.
JOSEPH L. DES JARDINS
BY
*Salvatore G. Militano*
ATTORNEY April 23, 1957     J. L. DESJARDINS     2,789,710
MECHANIZED PARKING GARAGE
Original Filed Aug. 30, 1948     13 Sheets-Sheet 9
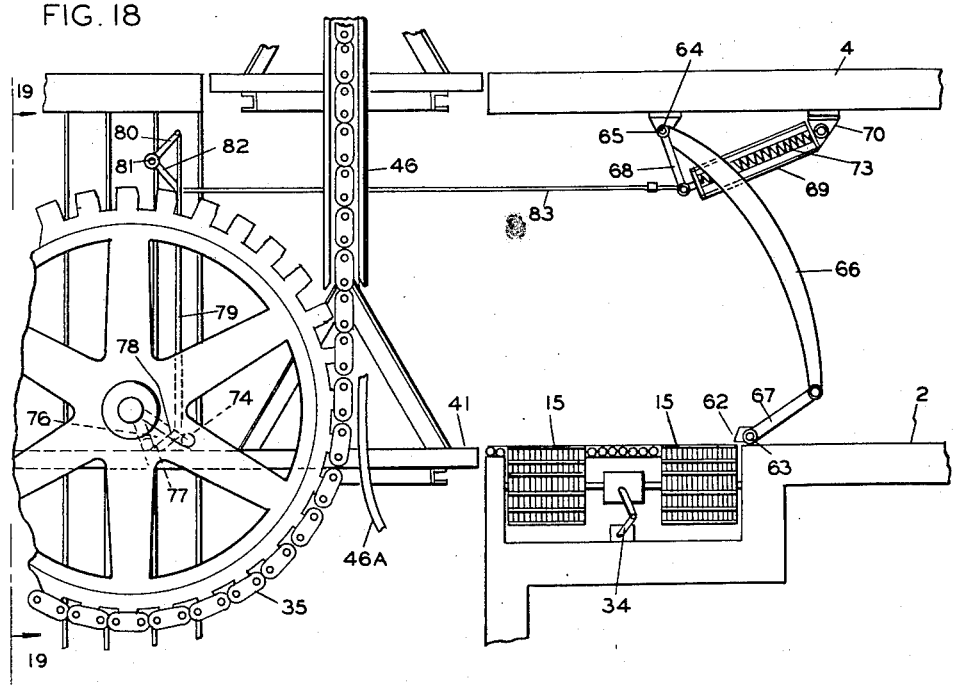
FIG. 18
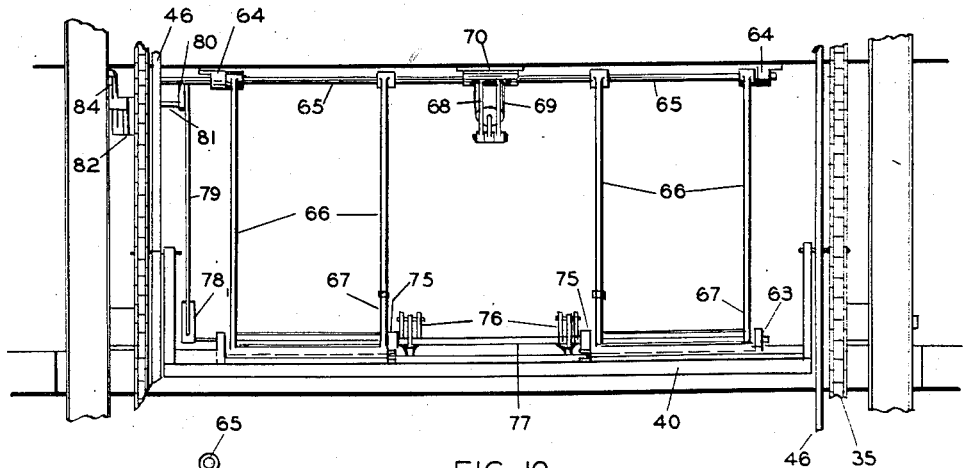
FIG. 19
FIG. 20
INVENTOR.
JOSEPH L. DES JARDINS
BY
Salvatore G. Militana
ATTORNEY April 23, 1957    J. L. DESJARDINS    2,789,710
MECHANIZED PARKING GARAGE
Original Filed Aug. 30, 1948    13 Sheets-Sheet 10

INVENTOR.
JOSEPH L. DES JARDINS
BY
ATTORNEY

April 23, 1957  J. L. DESJARDINS  2,789,710
MECHANIZED PARKING GARAGE
Original Filed Aug. 30, 1948  13 Sheets-Sheet 11

INVENTOR.
JOSEPH L. DES JARDINS
BY
*Salvatore G. Militana*
ATTORNEY

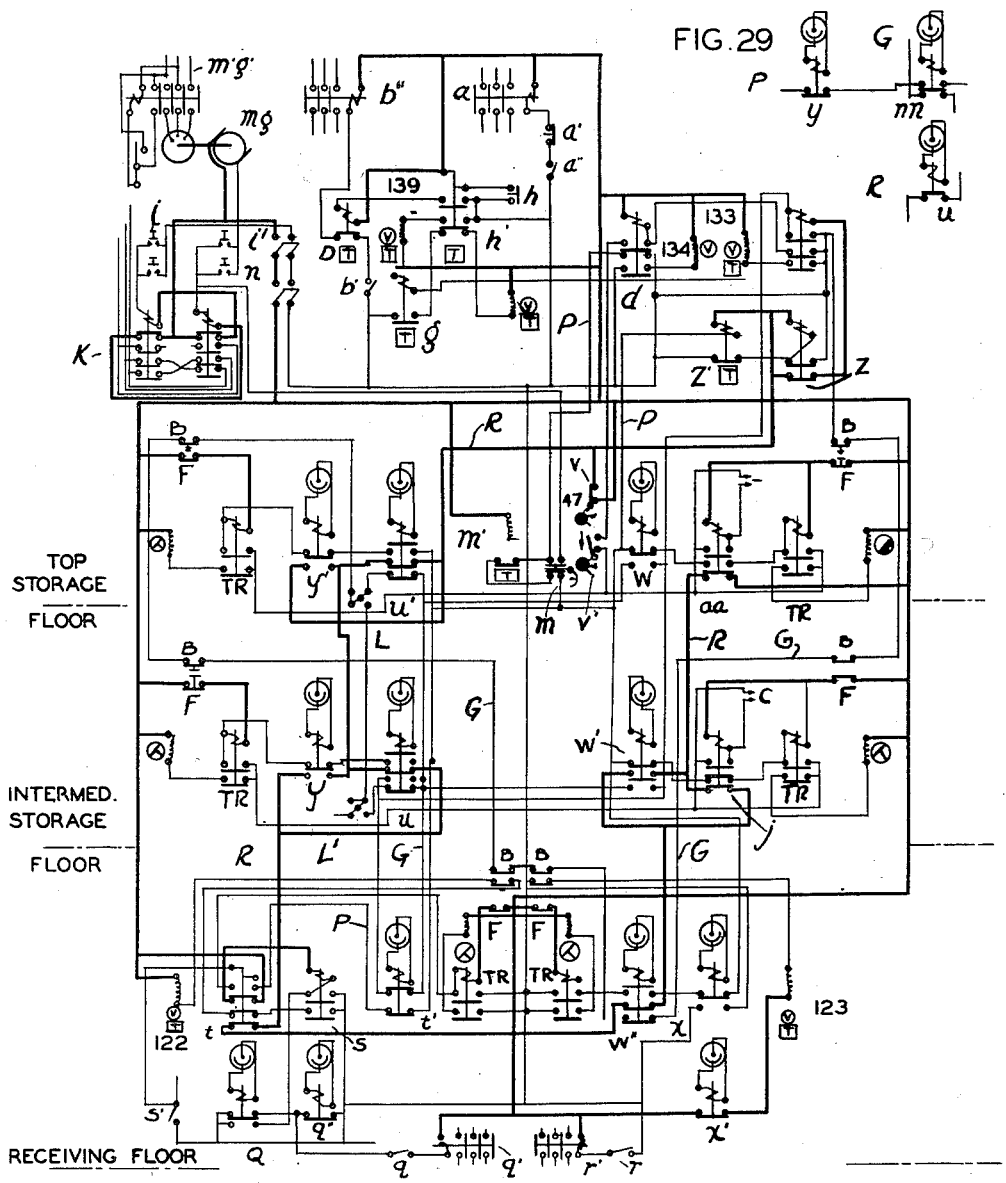

United States Patent Office 2,789,710
Patented Apr. 23, 1957

2,789,710

MECHANIZED PARKING GARAGE

Joseph L. Desjardins, Miami, Fla.

Original application August 30, 1948, Serial No. 49,241, now Patent No. 2,696,921, dated December 14, 1954. Divided and this application October 15, 1954, Serial No. 462,434

2 Claims. (Cl. 214—89)

This invention relates to a mechanized parking garage of the type employing an arrangement of hoisting and conveyor apparatus for the reception and parking of motor vehicles in a multi-story building and their reclamation therefrom. This is a divisional application of my Patent No. 2,696,921, issued December 14, 1954.

The present development of automobile traffic in metropolitan areas has already produced a congestion within shopping districts, such that the convenience of the automobile is materially reduced by problems attending the parking thereof within reasonable proximity of the businesses to be visited. This condition has led to the removal of portions of downtown enterprises to outlying suburban areas in order that patrons might avoid the difficulties and annoyances of downtown parking.

A partial solution of the foregoing problem has been the establishment of parking garages in downtown districts, such structures usually embodying a multi-storied building in which the vehicles are conducted by spiral ramps inclining upwardly from a receiving floor normally located at street level. These systems require the passage of automobile traffic across sidewalks fronting the building, thereby posing a hazard to pedestrians. Further disadvantages of the ramp delivery method in parking garages include wear on vehicle mechanisms, bruising of fenders, and uneconomical diversion of valuable space allotted to the disposition of the ramps.

According to my invention, the mechanized parking garage comprises a multi-story building having a receiving floor and a plurality of storage floors thereabove, the receiving floor being situated at a level below that of the street serving the garage and communicating therewith through underpass access and exit ways to eliminate the hazards of vehicular traffic across sidewalk areas.

The invention contemplates the employment of an endless chain elevator having an ascending flight and a descending flight, from which is suspended a plurality of carriers adapted to support the vehicles in the hoisting and lowering thereof between the receiving and storage floors. Traversing the receiving floor is an arrangement of vehicular conveyor belts for the delivery of incoming vehicles to the ascending flight and the reclamation of outgoing vehicles from the descending flight.

The invention contemplates, further, certain novel means to effect the transfer of the vehicles to load and unload the carriers, correlating these means with the elevator driving means whereby to prevent movement of the elevator during the operation of the vehicle transfer means.

A unique characteristic of the vehicular conveyor belts is the association therewith of a pedestrian conveyor, moving in synchronization with the vehicular belts to permit the driver of a vehicle to board or alight therefrom while the belts are in motion. The pedestrian belt is provided with an overhead grip strap conveyor moving in synchronization therewith and manually reachable by the patron to facilitate boarding or alighting from the pedestrian belt.

A further characteristic of the invention resides in the employment of a hydraulic and electrical control system governing the operation of the conveyor belts, the elevator served thereby, and the vehicle transfer means, whereby these mechanisms are governed in function by the individual vehicles transported thereby.

Prior parking garages of the type to which the invention applies, of which I am aware, generally include a building having arranged therein a multiplicity of turntables, conventional freight elevators, run-ways, and the like, imposing a corresponding multiplicity of car handling operations and impeding, in consequence, the orderly reception of vehicles into the garage structure and their discharge therefrom.

An object of the present invention is to provide a mechanized parking garage which will be safe and efficient in operation.

Another object of the invention is to provide a garage of the character described which will be capable of the expeditious reception of vehicles thereinto and the reclamation of vehicles therefrom.

A further object is to provide a building for a mechanized parking garage, of design and arrangement permitting the economical disposition of the space therein.

Still another object of the invention is to provide a mechanized parking garage having access and egress approaches which will be safe and convenient in use.

Yet another object is to provide a garage of the character and for the purposes described, with an automatic control system to govern the mechanisms thereof in safe and positive operation.

Other advantages of the invention will be descernible from the description thereof to be hereinafter set forth.

Figure 5:
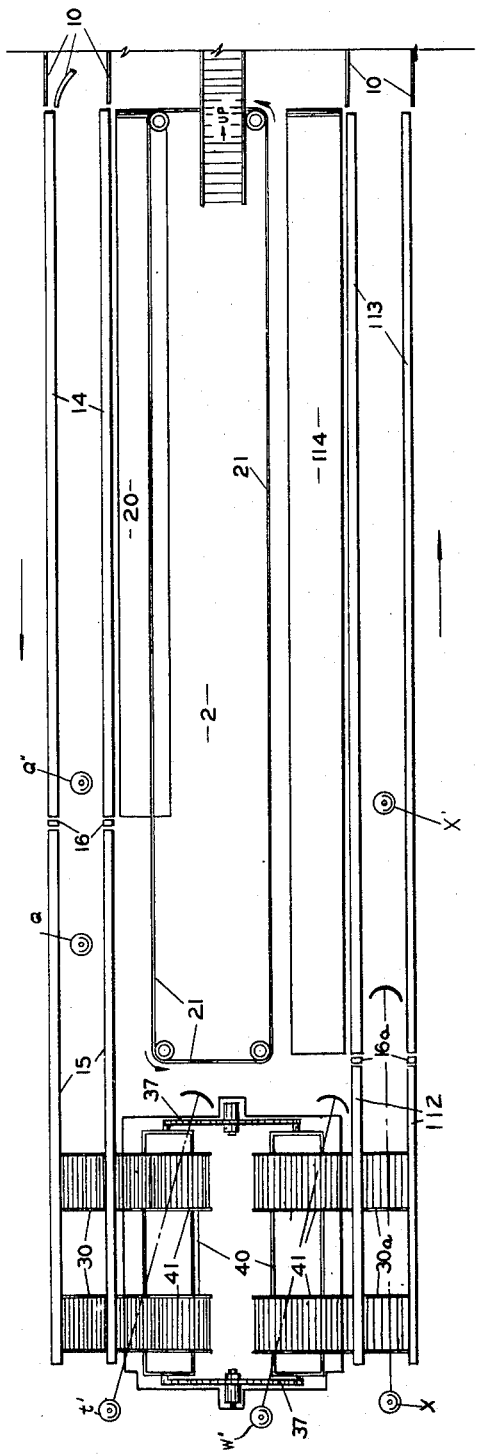
Figure 6:
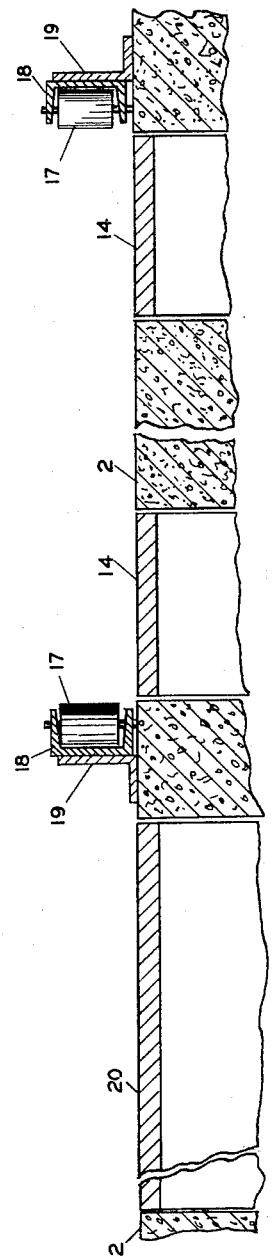
Figure 9:
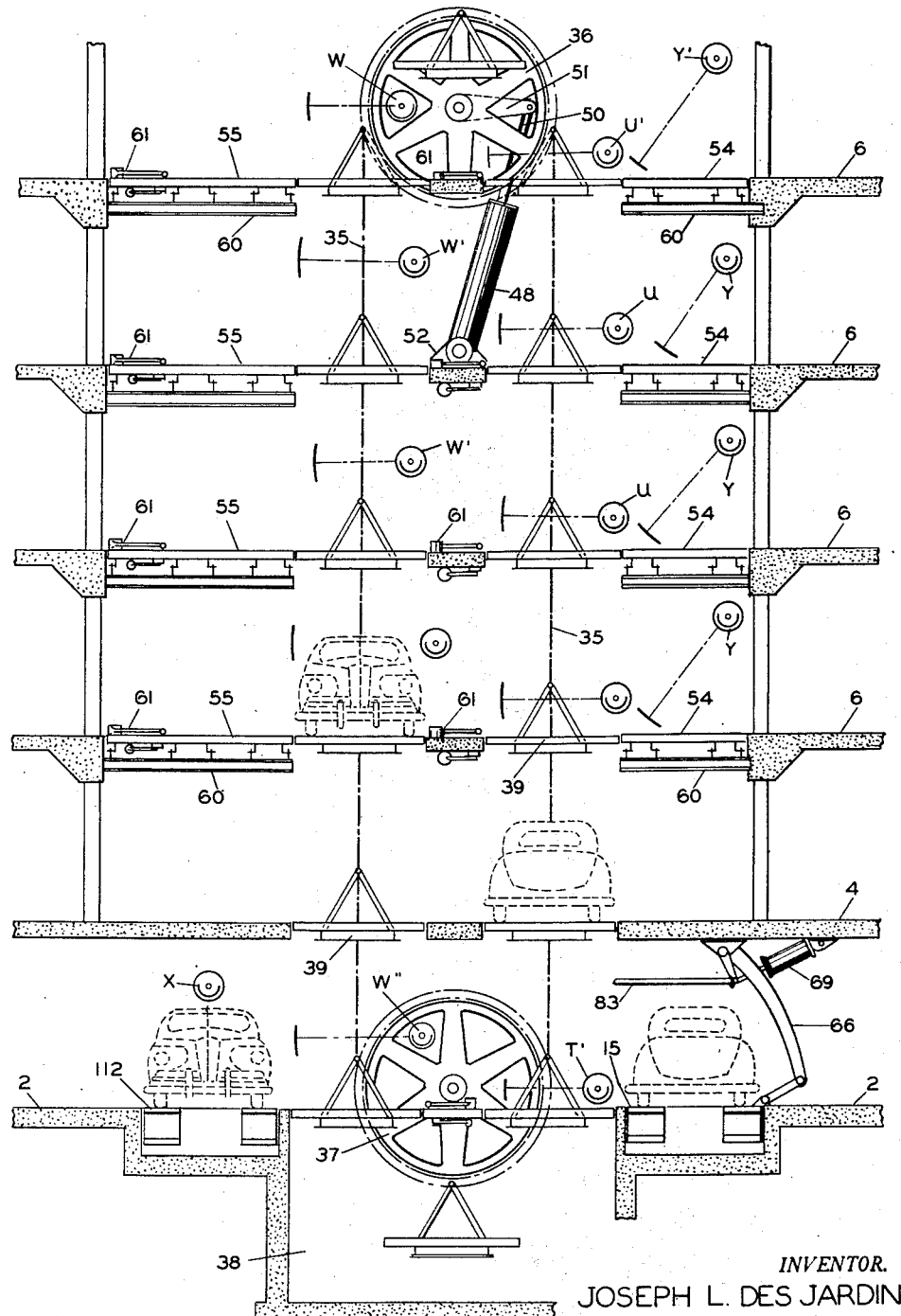

These and certain other novel features residing in the invention are embodied in a mechanized parking garage shown by way of example in the accompanying drawings, in which the views are as follows, like reference numerals designating identical parts throughout the several views:

Fig. 1, a front elevation of a building to which the invention may be applied;

Fig. 2, a plan of the entrance portion of the receiving floor and street approaches thereto;

Fig. 3, an elevational detail of rampway guide rails;

Fig. 4, a side elevation of a bumper switch rod;

Fig. 5, a plan of the receiving floor, being a continuation of the view shown in Fig. 2;

Fig. 6, a detail of the wheel guard rails;

Fig. 7, a longitudinal vertical section through the building;

Fig. 8, a continuation of the view shown in Fig. 7;

Fig. 9, a transverse vertical section through the elevator hatchway; and

Figure 10:
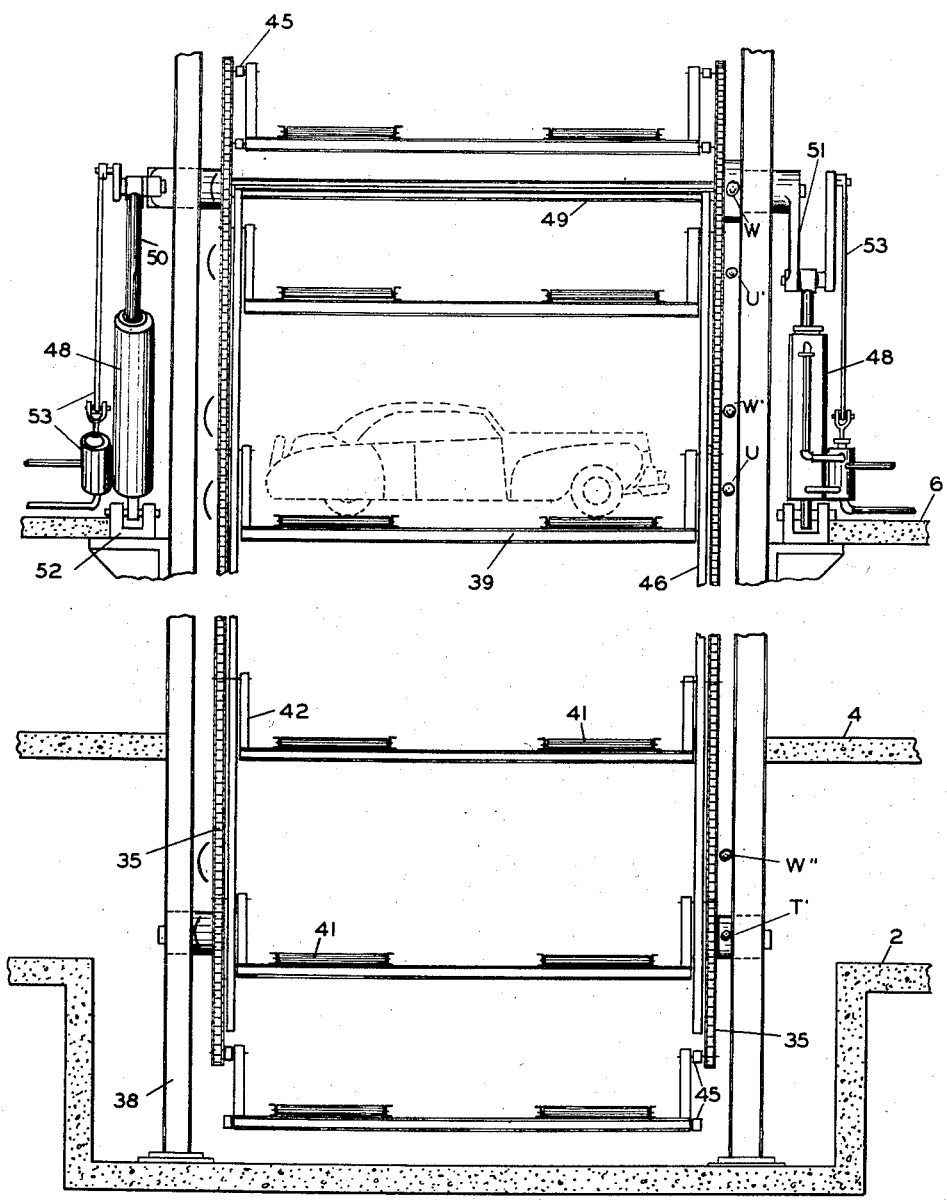
Figures 21, 22:
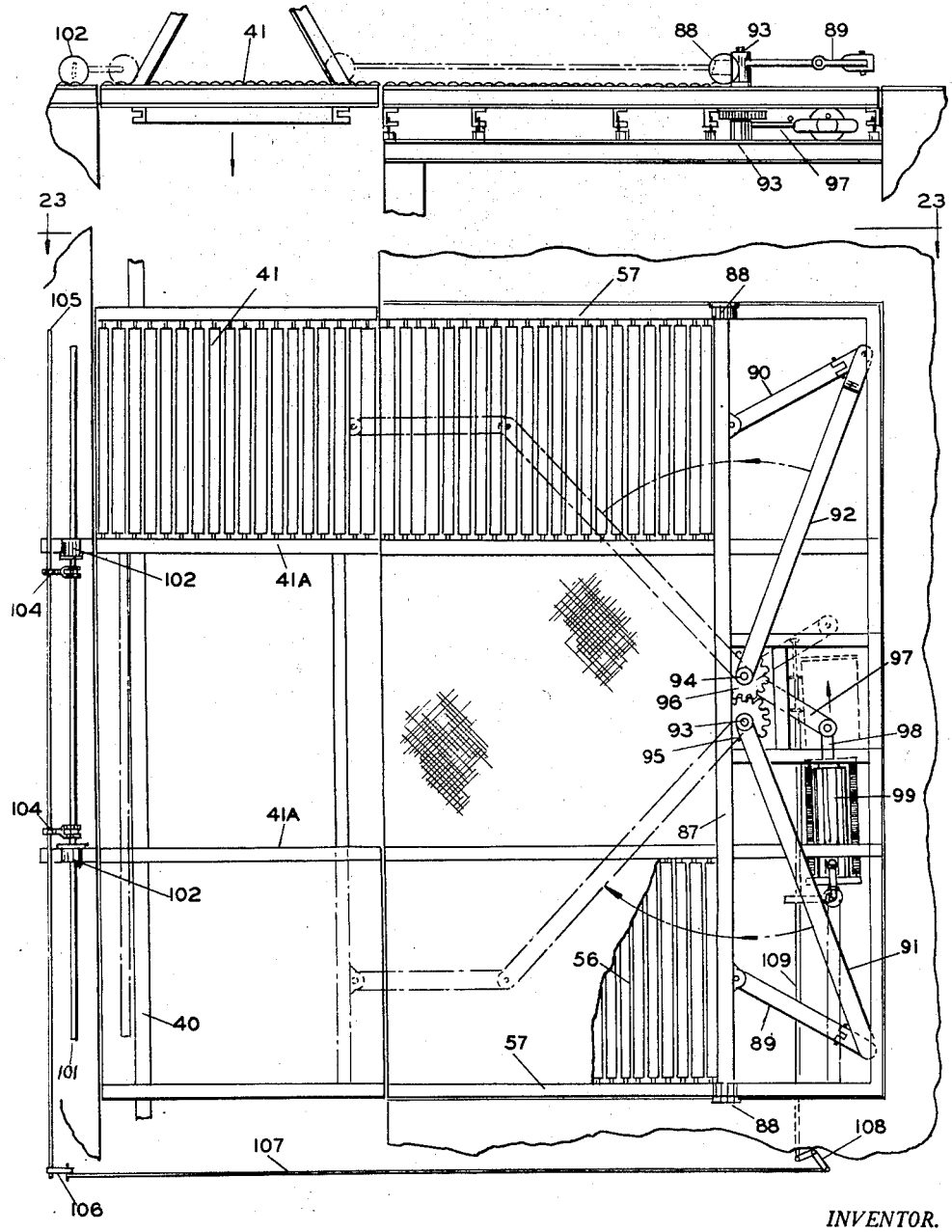
Figure 24:
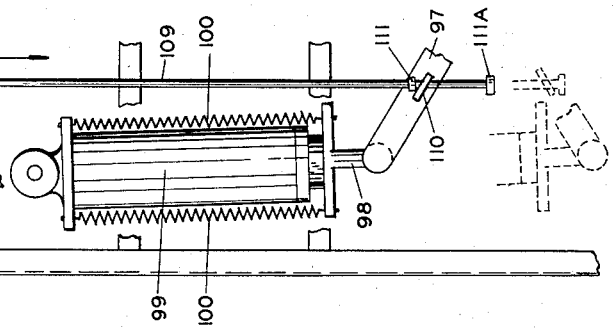
Figure 23:
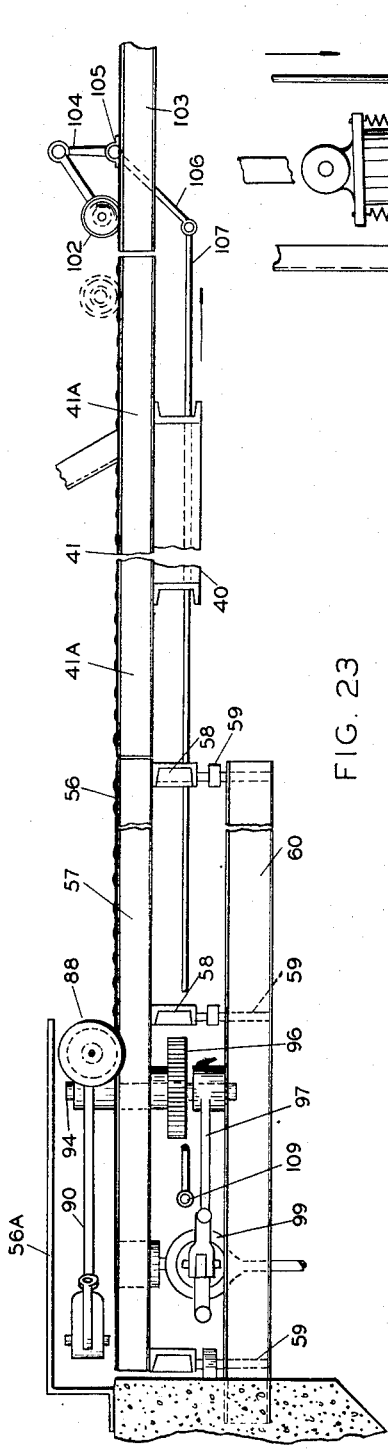
Figure 25A:
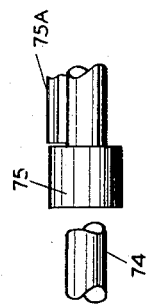
Figure 25:
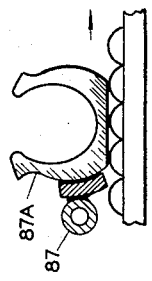
Figure 26:
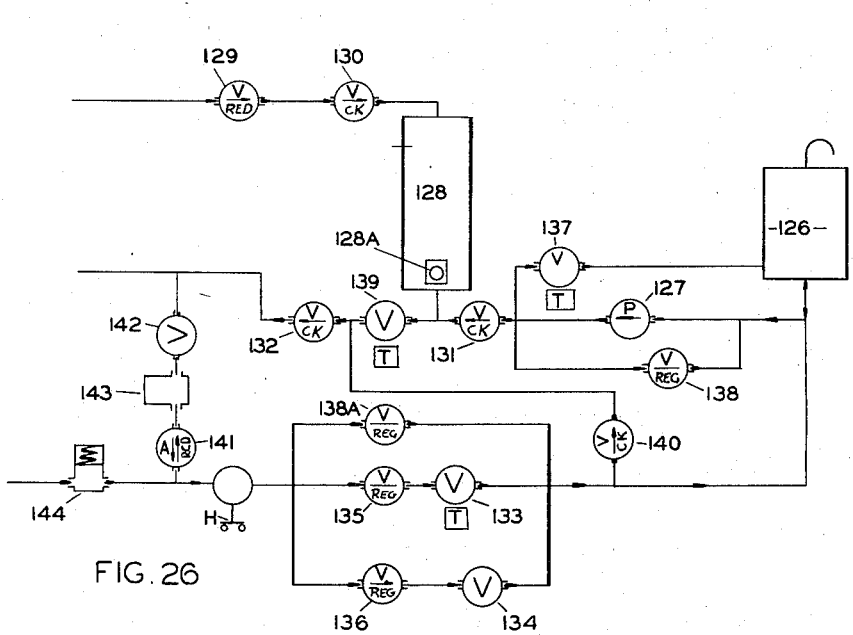
Figure 27:
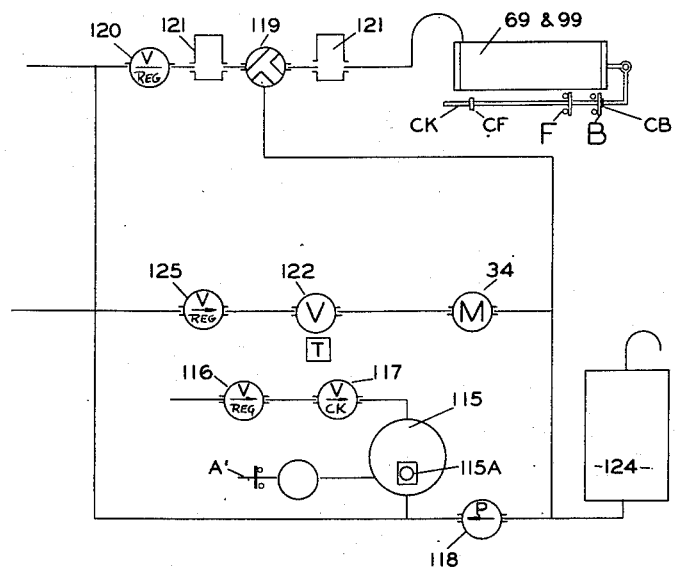

Fig. 10, a longitudinal vertical section therethrough;

Fig. 11, a plan of a vehicle carrier;

Fig. 12, a section taken on line 12—12, of Fig. 11;

Fig. 13, is a side elevation, in part, of the view shown in Fig. 11;

Fig. 14, a fragmentary plan of a transfer belt at the junction thereof with a conveyor belt;

Fig. 15, an elevation of the view shown in Fig. 14;

Fig. 16, an end elevation of a transfer belt with a portion of the tread removed;

Fig. 17, a partial detail, in plan, of the transfer belt tread assembly;

Fig. 18, a side elevation of the receiving floor vehicle loading station;

Fig. 19, an elevation taken from line 19—19, Fig. 18;

Fig. 20, a detail of an arresting bar actuating link assembly;

Fig. 21, a plan of a storage floor loading platform;

Fig. 22, an end elevation, in part, of the view shown in Fig. 21;

Fig. 23, an enlarged elevational detail taken from line 23—23, Fig. 21;

Fig. 24, a fragmentary plan of the cylinder actuated assembly shown in Fig. 23;

Fig. 25, a sectional detail of a pusher bar in operative relation to a vehicle tire impelled thereby;

Fig. 25a, a fragmentary plan detail of an arresting bar structure;

Fig. 26, a flow diagram of the elevator hydraulic system;

Fig. 27, a flow diagram of the transfer device hydraulic system;

Figs. 28 and 29, schematic diagrams of the electrical control system.

The mechanized parking garage is embodied in a building 1, having a plurality of superimposed floors, constructed of materials and provided with walls, roof, and essential load sustaining structures conventional in the art.

The basement or receiving floor 2, functioning as the vehicle entrance and discharge floor, is located substantially below the level of the street or trafficway 3 serving the building.

The street floor 4 may be utilized for commercial purposes as, for example, for stores, offices or the like, access thereto being provied through an entrance doorway 5. The upper or storage floors 6 are designed for the parking of vehicles to be delivered thereto by means to be hereinafter described.

The receiving floor 2 communicates with the street 3 through two curvilinear ramps 7 and 8, the outer extremities of which terminate in tangential alinement with the trafficway of the street to facilitate the diversion therefrom of vehicular traffic entering the garage and the return of vehicles discharging from the garage into the traffic stream thereabove.

Thus, the ramps form vehicular underpasses under the sidewalk 9 whereby to permit the ingress and egress of traffic without hazard to pedestrians.

One of the ramps functions as an entrance way and the other, as an exit way, according to the prevailing direction of the traffic stream serving the building. Thus, assuming the traffic stream along the street 3 to flow from right to left, as viewed in Fig. 2, the ramp 8 is presumed to be the entrance way and the ramp 7, the exit way, as will be understood.

Anchored to the floor of each ramp and extended inside the building is a pair of guide rails shown generally at 10 (Figs. 2 and 3), spaced to form a guideway to accommodate the wheels of a vehicle and direct the passage thereof along the ramp. Each guide rail comprises a plurality of axially alined rollers 11, rotatable on a shaft 12 which is carried by upright brackets 13, secured to the floor of the ramp and spaced longitudinally thereof.

Thus, the rollers 11 for anti-friction surfaces which assist in the absorption of the impact of tires impinging thereagainst to effet the deflection thereof along the course of the rampway.

Communicating with the guideway along the entrance ramp 8, is a pair of endless belts (Fig. 5), forming an entrance conveyor 14, which extends rearwardly of the receiving floor and is spaced to register with the guide rails 10 to engage the wheels of a vehicle conducted down the entrance ramp 8. This conveyor communicates, in turn, with a corresponding pair of transfer belts 15 spaced to register with the conveyor 14, to receive the wheels of a vehicle delivered thereto from the entrance ramp.

Interposed between the entrance conveyor 14 and transfer belts 15 is an idler roll 16, the function of which is to absorb a speed differential between these belts. Thus, when a car, having its rear wheels locked by the emergency brake, clears conveyor 14 the idler roll engages these wheels to minimize frictional wear on the tires thereof which would otherwise result from the engagement of these tires by the delivery end of conveyor 14 while the vehicle is stationary on belts 15.

The entrance conveyor 14 and transfer belts 15 may be provided along the marginal edges thereof with wheel guards (Fig. 6), comprising a plurality of alined rollers 17, pintled on upright axes in a channel rail 18, supported by angle brackets 19 which may be secured to the floor 2. These guards may be extended along the marginal edges of the transfer belts and conveyor paths, throughout the system at any suitable locations to confine the vehicle in transient thereon. The rollers 17 may be pintled on axes slanting upwardly and outwardly to provide a tire-engaging anti-friction surface adapted to conform to the surface contour of the tire.

Arranged alongside the conveyor 14 and moving in synchronization therewith, is a pedestrian belt 20, adapted to receive and transport the driver of a vehicle alighting therefrom while the conveyor is in motion.

Paralleling the pedestrian belt belt (Figs. 5 and 7) is an overhead trolley rail shown generally at 21, designed to movably support an endless chain conveyor from which is suspended a plurality of grip straps 22, secured thereto in any suitable manner. This conveyor moves in synchronization with the pedestrian belt and the belt straps are suspended at a convenient height to assist a patron to grasp a strap for assistance in boarding or alighting from the pedestrian belt, as will be understood.

The transfer belts 15 have an articulated working tread (Figs. 14 to 17), comprising a plurality of laterally disposed channels 23 between the flanges of which is pintled a row of rollers 24 rotatable on axes parallel to the belt path to facilitate the lateral shifting of a vehicle therefrom. The channels are supported by axles 25 projecting endwise thereof and journaled in grooved wheels 26 arranged at each end of the channel. A link assembly 27, forming a flexible chain in which the axles are engageable to form the link pins, connects the channels to form an endless belt. This belt is driven by a pair of sprocket wheels 28 suitably journaled in adjacent framing structure, the toothed peripheries of the sprockets engaging wheels 26 to impart motion to the belts. A rail 29, adapted to support the wheels 26 in travel thereover, is arranged along the belt path and supported in any suitable manner from adjacent framework structure.

Adjacent the discharge end thereof, the transfer belt path (Fig. 5) is intersected at right angles thereto by a pair of roller skids 30, spaced longitudinally of the belt path to receive the wheels of a vehicle in the lateral shifting thereof from the belts to a vehicular elevator therebeside to be presently described.

Spaced endwise from the headwheels of the transfer belts, Fig. 4, is a normally upright rod 31 adapted to actuate a bumper switch, shown generally at 32, upon the engagement of a vehicle front bumper 33 with the rod 31, for a purpose to be presently described.

Motive power to propel the entrance conveyor 14, and pedestrian conveyor associated therewith, is derived from an electric motor (not shown) operatively connected thereto. Motive power to drive the transfer belts 15 is supplied by a hydraulic motor, shown generally at 34 (Fig. 18), and included in a hydraulic and electrical control system to be hereinafter described.

*The Elevator*

The invention contemplates to accomplish the hoisting and lowering of vehicles between the receiving floor and storage floors thereabove by means of an endless chain elevator (Figs. 9 and 10), thus providing a continuous ascending flight and descending flight for the expeditious handling of vehicular loads.

The elevator comprises a pair of endless chains 35 driven by a pair of axially spaced sprocket type headwheels 36, arranged on a topmost floor of the building. The chains pass over a corresponding pair of tailwheels 37 disposed in a suitable pit 38 formed at the bottom of the elevator hatchway.

Suspended from the chains and extending endwise therebetween, is a plurality of carriers 39, disposed at intervals along the chains equivalent to the intervals obtaining between floor levels of the garage. Each carrier has a horizontal, rectangular frame 40 (Fig. 11), formed of welded structural shapes, on the wheel base of a vehicle carried thereby. These skids are framed in channels 41a and designed for registration with the skids of like construction embodied in the loading and unloading platforms to be presently described.

The frame 40 is carried at each end thereof by an A-frame bracket 42 structurally secured thereto and terminating in the apex thereof in an annular bearing 43 in which is journaled the inner end portion of a shaft 44, the outer end portion of which forms a link pin in the chain 35. Thus, the carriers are swivable relative to the chains to permit their travel in upright position to clear the head and tail wheels, and associated mechanisms, in passage therebetween.

The carriers are provided at each end thereof with a pair of vertically alined guide rollers 45, the upper roller being axled on the shaft 44 and the lower roller on an outwardly projecting pin secured endwise of the frame. These guide rollers are adapted to travel between upright guideways 46 formed of structural members of suitable section and positioned along the hatchway sides so as to confine the rollers 45 therebetween to prevent tilting or canting of the carriers. At the upper and lower termini thereof, the guideways are flared as at 46a (Fig. 18), to facilitate the passage of the guide rollers therealong.

The shaft 44 has journaled at the end thereof, a contact roller 47, designed to engage a contact switch mechanism mounted in the hatchway for a purpose to be hereinafter described.

Motive power for the elevator is derived from a pair of hydraulic cylinders 48 arranged at each end of a main shaft 49 to which are keyed the headwheels 36. Each cylinder has a piston 50 connected to the main shaft by a crank 51, and is trunnioned at the bottom thereof, as at 52, to permit the cylinders to oscillate under the influence of the crank 51. A suitable valve gear, shown generally at 53, has operative communication with each cylinder, in a manner conventional in the art, to govern the liquid flow therethrough.

It will be understood that these cylinders are provided with the usual liquid pressure and discharge piping, valves and fittings, embraced in a hydraulic and electrical control system to be hereinafter more specifically described.

Adjacent the elevator hatchways on each storage floor is formed a vehicle supporting platform serving the ascending flight as an unloading platform 54 and the descending flight as a loading platform 55. These platforms are substantially similar in construction, comprising (Figs. 21 and 23) a pair of roller skids 56 formed of a plurality of rollers pintled in a spaced apart pair of channels 57, and adapted to register with the carrier skids 41 which are alined therewith when a carrier reaches the floor level. The skids 56 are supported upon a plurality of spaced apart cross beams 58 which are mounted for vertical adjustment upon a corresponding plurality of screw jacks 59. These jacks are carried by a horizontal structural frame 60 anchored in any conventional manner to the building structural frame convenient thereto. Upon rotation of the screw jacks 59, the platform may be elevated or depressed so as to bring the platform skids 56 into vertical registry with carrier skids 41 whereby to compensate for discrepancies in registry due to wear on the elevator chains or mechanisms associated therewith.

A novel feature of my invention resides in a transfer device, shown generally at 61 (Fig. 9), whereby the vehicles are shifted, in the loading and unloading thereof, between the carriers and platforms therebeside. A modified form of this transfer device employed on the receiving floor to load the ascending flight of carriers from transfer belts 15 will be described first.

In this embodiment, the transfer device (Figs. 18 and 19) comprises a pair of longitudinally alined pusher bars 62 having suitable contact faces adapted to engage and abut the lower sidewall portions of the tire on a vehicle positioned on transfer belts 15 for delivery to the elevator. These pusher bars are supported on rollers 63 axled thereto and equipped with rubber peripheries designed to traverse the transfer belt path to carry the pusher bar laterally thereacross.

Pivoted to overhead brackets 64 is a horizontal shaft 65 to which is keyed a plurality of downwardly inclined crank arms 66 terminating at their lower ends in flexible link rods 67 operatively connected to pusher bars 62 whereby the pivotal movement of crank arms 66 imparts a forward movement to pusher bars 62. The shaft 65 is pivotable by a crank 68 keyed at one end thereof to the shaft 65 and pivoted at its other end to the piston rod of a hydraulic cylinder 69 suspended from an overhead bracket 70 and journable therein.

Upon the extension of the piston rod of cylinder 69, pusher bars 62 engage the lower sidewall portions of the vehicle tires to thereby impel the vehicle, through intervening crank mechanisms, laterally across the transfer belts and upon the carrier skids 41. The transfer skids 30 (Fig. 16), which facilitate this movement, have an adjustable endwise extension 71, pivotally supported in any suitable manner upon underlying framing structure, and adapted to be elevated or depressed by suitable screw jack assemblies 72 positioned thereunder, so as to register, vertically, with the carrier skids 41. Thus the transfer skids 30 are adjustable to compensate for any discrepancy in their registration with the carrier skids resulting from wear on the elevator chains or associated mechanisms.

The cylinder 69 has a pair of retractor springs 73 arranged along the sides thereof and connected to the piston to assist its retracting stroke. This cylinder is further provided with the usual liquid pressure and discharge piping and fittings, known in the art, and embraced within a hydraulic and electrical control system to be presently described.

Associated with the transfer device and operable thereby is an arresting bar 74 normally extending along and upon the rear marginal edge of the ascending hatchway. This bar, of substantially similar section as that shown in Fig. 25, is axled in rollers 75 (Figs. 18, 19 and 25a) of construction similar to that previously described for rollers 63, and is faced with an abutting member 75a of suitable contour to engage the lower sidewall portions of a vehicle tire. By means of a pair of knuckle cranks 76, pivotably connected thereto, which are expandible upon rotation of a shaft 77 keyed to these cranks, bar 74 is movable upon the carrier skids 41 and into abutting engagement with the tires of a vehicle advancing thereagainst. Shaft 77 is turnable by a crank 78, which is actuated by an upright rod 79 connected at its upper end for vertical reciprocation by a crank 80. This crank is actuated by an auxiliary shaft 81 which is keyed to an outer crank 82 pivotable by a horizontal rod 83. Rod 83 terminates at its opposite end in a link 84 (Fig. 20), keyed at one end to cylinder-actuated shaft 65 and pivoted at its other end to rod 83.

Thus, when the cylinder 69 is operative to shift a vehicle to the carrier, the arresting bar 74 is impelled, through the intervening crank mechanism herein described, toward and upon the rear edge portion of the carrier skids to thereby arrest the lateral travel of the vehicle to prevent overrunning of the skids.

The distance which the arresting bar advances upon the carrier skids is pre-determinable by adjusting the slideable connection of the horizontal rod 83 with the link 84.

The link 84 has a socket formed in the bottom portion thereof suitable for the reception of the rod 83 in slideable movement therethrough. The rod has mounted thereon a pair of spaced apart limit collars 85 and 86, between which the link is movable without effecting any corresponding movement of rod 83. When the link, pivoted by shaft 65, is thus brought into engagement with collar 85, rod 83 moves therewith to actuate the crank mechanisms connected thereto so as to advance the arresting bar. Thus, the arresting bar is delayed in movement until the vehicle has occupied the carrier in predetermined position thereon. A similar time lag in the retraction of the arresting bar ensues upon the back stroke of the piston in cylinder 69, link 84 returning to engage collar 86 before the arresting bar can begin its retractive movement thereby allowing for the arresting of the vehicle prior to the retracting of the arresting bar 74. The arresting bar is thus delayed until the pusher bars have been almost fully extended to load the vehicle in its proper position upon the carrier.

The transfer devices shown generally at 61 (Fig. 9) function as loading or unloading mechanisms, according as they are applied to the descending or ascending flights of the elevator, as will be understood.

In this embodiment, each transfer device comprises a pusher bar 87 having a suitable contact face adapted to engage the lower sidewall portions of the vehicle tires adjacent thereto. This bar is carried on rollers 88 axled thereto and flanged for confinement to the top surfaces of channels 57 upon which these rollers are designed to travel.

Adjacent the ends and rearwardly thereof, the pusher bar 87 has pivoted thereto a pair of push rods 89 and 90, each of which is swivably connected to a corresponding pair of crank arms 91 and 92 which are keyed, at their opposite ends, to a corresponding pair of vertical shafts 93 and 94. These shafts are each keyed to a corresponding pair of intermeshing gears 95 and 96. Keyed to the shaft 94 is a connecting rod 97, the opposite end of which is pivotably connected to the piston rod 98 of a hydraulic cylinder 99 arranged for pivotal movement in the platform framing structure.

It will be understood that the cylinder 99 is provided with retractor springs 100, and liquid pressure and discharge piping, fittings and valves conventional in the art and included in a hydraulic and electrical control system to be hereinafter more specifically described.

Upon the extension of the piston rod 98, the connecting rod 97 is thereby pivoted to rotate the vertical shaft 94, thus imparting counter-clockwise rotation to gear 96 and clockwise rotation to gear 95 in mesh therewith, which likewise rotates shaft 93 clockwise. Rotation of shafts 93 and 94 effects the simultaneous pivotal movement of crank arms 91 and 92, thereby urging push rods 89 and 90 against the pusher bar 87 to effect its movement forwardly thereof from its full line to its broken line positions, as illustrated in Fig. 21.

A vehicle, the tires of which are engageable by the pusher bar, will thus be impelled across the platform occupied thereby and positioned upon the carrier skids 41.

Transfer devices 61, functioning to load carriers of the descending flight, are equipped with an arresting bar 101 movable on rollers 102 axled thereto. These rollers are flanged for confinement to channels 41a over which they are adapted to travel and are supported, in their retracted position, upon channel rails 103, spaced to register with the carrier skid channels 41a. Arresting bar 101 is advanceable upon the expansion of a pair of knuckle cranks 104 pivoted thereto and actuated by a shaft 105 to which these cranks are keyed. Shaft 105 terminates at one end thereof in a crank 106 to which it is keyed for pivotal movement in response to the reciprocation of a rod 107 having pivotal connection with crank 106. Rod 107 is reciprocable by an L-crank 108, pivotable, in turn, by a rod 109 having a slidable connection with the connecting rod 97.

Upon the extension of piston rod 98 and the ensuing movement therewith of connecting rod 97, rod 109 becomes movable to actuate arresting bar 101 through the intervening mechanisms herein described. A delayed operation of the arresting bar in relation to the reciprocal movement of pusher bar 87 is effected through the slideable connection of rod 109 with connecting rod 97. Rod 109 is slideably supported upon connecting rod 97 through a guide ring 110 formed thereon, and is limited in movement therethrough by a pair of limit collars 111 and 111a, adjustably mounted on rod 109 and spaced longitudinally thereof. It will be seen, from the hereinbefore described operation of rod 83 in its association with the transfer device serving the ascending flight at the receiving floor, that arresting bar 101 lags in its advancing and retracting movements behind the corresponding advancing and retracting movements of pusher bar 87. This lag in arresting bar operation serves to insure the proper seating of the vehicle tires against the arresting bar abutting thereagainst, the arresting bar remaining momentarily in place after the pusher bar has initiated its retractive movement.

The pusher bar mechanisms of transfer devices may have a suitable protective plate 56a installed thereover and secured in any convenient manner to adjacent floor structure.

It will be understood that the shafts and crank assemblies, hereinbefore described for the actuation of the pusher bar and arresting bar mechanisms, may be journaled in suitable supports secured in any convenient manner to adjacent framing structure, such supports and the manner of their installation being well known in the art of their specific description, therefore, not essential to an understanding of the invention.

Serving the descending flight of carriers for the reception therefrom of vehicles lowered from the storage floors, is a pair of transfer belts 112 arranged on the receiving floors 2 (Fig. 5). These belts have a pair of transfer skids 30a intersecting the path thereof to facilitate the shifting of a vehicle thereto by a transfer device similar to transfer devices 61 hereinbefore described and positioned between the ascending and descending hatchways in operative relation to descending carriers.

Transfer belts 112 communicate, through an idler roll 16a, with an exit conveyor 113, adapted to register at its delivery end with guide rails 10 of the exit rampway 7. A pedestrian belt 114 parallels exit conveyor 113 to facilitate boarding a vehicle, reclaimed from the parking system, while in transit on conveyor 113. Pedestrial belt 114 is served by the returning flight of the overhead grip strap conveyor 21 to assist a patron in the boarding thereof by grasping one of straps 22.

The transfer skids 30a, belts 112, conveyor 113 and pedestrian belt 114, duplicate substantially the construction and functions of skids 30, belts 15, conveyor 14 and pedestrian belt 20, hereinbefore described, as will be understood.

Thus, a vehicle discharged from a carrier of the descending flight is received by transfer belts 112 for delivery to exit conveyor 113, where it is boarded by the driver thereof for exit from the building and return to the traffic stream of street 3, to which it is conducted by exit rampway 7.

*The hydraulic system and controls*

The hydraulic cylinders 48 motivating the elevator, cylinders 69 and 99, actuating the transfer devices, and hydraulic motors 34 driving transfer belts 15 and 112, are operatively associated within a hydraulic system exemplified by schematic diagrams shown in Figs. 26 and 27.

Transfer device cylinders 69 and 99 (Fig. 27) are served by suitable pressure and discharge lines emanating, in conventional manner, from an accumulator 115, maintained under pre-determinable working pressure by an air supply line having an air reduction valve 116 and checked against air escape by check valve 117. A float valve 115a is arranged in the accumulator to seal the liquid connection thereto upon a drop of the liquid level therein, so as to prevent the admission of air to the liquid line. Line pressure is generated by an electric motor driven pump 118, controlled by a motor starter $a$ which is automatically responsive to a pressure switch $a'$ and manually responsive to a switch $a''$.

A 3-way solenoid-operated valve 119, interposed in the liquid supply line, is operable upon energization of its solenoid to direct liquid to the cylinder but is returnable, under the influence of suitable spring mechanism incorporated therein, to a normal position in which it passes liquid discharging from the cylinder. Regulation of cylinder operating speed is effected through a flow valve 120. Alleviator structures 121 may be included in this assembly to absorb surges in the flow therethrough and to cushion the impact of pusher bars 62 and 87 against vehicle tires engaged thereby.

Hydraulic motors 34, driving the transfer belts, are controlled by solenoid-operated valves 122 for belts 15, and 123 for belts 112. (See Figs. 5 and 28.) These valves are fitted with time delay elements conventional in the art. A flow valve 125 regulates the speed of motors 34 and a suitable receiver 124 takes liquid discharging from these motors and cylinders 69 and 99.

These cylinders are equipped with a rearwardly extending switch-actuating arm $ck$, connected to the piston and reciprocal therewith. Mounted on this arm is a pair of longitudinally spaced limit collars $cb$ and $cf$, which are movable therewith for engagement with a backstroke limit switch B and a forward stroke limit switch F. These switches may be attached to the cylinder framing structure for alternate actuation by the limit collars upon the extension and retraction of the piston for a purpose to be presently explained.

The elevator motivating cylinders 48 are served by pressure and discharge liquid lines conventional in the art and shown, diagrammatically, in Fig. 26. This system is supplied from a receiver 126, by an electric motor-driven pump 127 controlled by a starter $b''$ responsive to a manual switch $b'$ and, automatically, to a time-delayed opening relay $b$. (See Fig. 28.) The installation includes an accumulator 128 fitted with a float valve 128a of construction and function similar to float valve 115a (Fig. 27). Air to the accumulator is directed through an air supply line having interposed therein a reduction valve 129 and check valve 130.

The accumulator may be designed for a capacity sufficient to supply cylinders 48 with liquid adequate in quantity to move the elevator through substantially half its total upward travel. Air reduction valve 129 can be set for accumulator pressure sufficient to capacitate the elevator to lift an average vehicle one floor interval, including starting torque of the apparatus, when substantially half the liquid requirement of cylinders 48 is contained in the accumulator. Check valve 131 prevents reversal of liquid flow from the accumulator and back pressure from the cylinders is blocked by check valve 132. Interposed in the discharge line, are a running-and-slowdown valve 133 and a quick-acting valve 134, each of which is influenced, respectively, by flow valves 135 and 136 for constant flow therethrough. Valve 133 is time-delayed and solenoid actuated. Valves 135 and 136 are of designs in which inlet and outlet flow is equalized regardless of inlet pressure, their function being to govern the elevator speed.

Valves 133 and 134 deliver to receiver 126. Pump 127, normally running, has a by-pass through normally open spring-held valve 137 which is closeable by a solenoid, time-delayed in actuation. This pump has a secondary by-pass through relief valve 138 and relief valve 138a is interposed to by-pass valves 133 and 134. Relief valves 138 and 138a are pre-determinedly set to relieve at the ultimate strength of the elevator chains 35, their purpose being to function in the event of a mechanical failure which might involve a sudden stoppage of the elevator apparatus, to minimize any resulting over strain of the chains or mechanisms associated therewith. With the electric starting circuit, hereinafter described, closed, and the elevator lifting greater weight than is being lowered, that is to say, when working under a "lagging" load, valves 133 and 134 will open and valve 137 will close, charging the hydraulic circuit. The control is such, that with a magnetically-held relay $f$ open, valve 133 will be closed so as to decelerate the elevator to a pre-determined speed.

When a carrier arrives at a floor level, stop valve 134 closes, stopping the flow through the hydraulic circuit governed thereby and arresting the elevator. During the time elapsing to actuate the transfer devices in the vehicle shifting cycle, valve 137 remains closed to charge liquid to the accumulator, compressing the air therein with liquid, and progressively building up pressure to overcome starting torque and maintaining load on the pump as long as demand is imposed on the elevator. Valve 137 is retarded in action by a time-delayed opening relay $g$ for a period slightly longer than required for the operation of the transfer devices.

Pump capacity need approximate only half the flow capacity of valves 135 and 136, as accumulator pressure continues to build up by a liquid enlargement therein as the elevator load increases by the addition thereto of one vehicle per stop sequence.

Under maximum load conditions, as when all carriers on the ascending flight are loaded, the pump motor will, of course, have imposed thereon its full capacity to charge the accumulator. A power economy is derived, however, from the above described adaptation of accumulator pressures to the variable loadings of the elevator, wherein valve 137 is utilized to eliminate, in effect, starting torque of the pump motor. The accumulator develops only the pressure required to move the then existing load on the elevator.

Conversely, when the elevator is lowering greater weight than it is lifting, that is to say, when working under a "leading" load and thus without pressure from the accumulator, valve 137 will be left open. Valve 139, spring-held in normally open position, is closeable by a solenoid responsive to an adjustable pressure switch $h$ having a time-delay element to avoid sudden surges in the flow and equipped with normally open contacts.

Under the foregoing load conditions, the resulting pressure rise on the discharge side closes switch $h$, energizing the solenoid of a relay $h'$ which is time-delayed to permit the movement of the elevator through one floor interval including the time elapsing for operation of the transfer devices associated therewith. After this cycle, relay $h'$ prevents the closing of valve 137 but closes valve 139, thus directing the flow through a check valve 140 and over to the pressure side of the system. This control arrangement is thus seen to exploit a power economy inherent in the mechanical advantage deriving from a "leading" load on the elevator. If continued over a substantial period, as when extensive reclamation of vehicles is in progress during late afternoon and after theater hours, a time-delayed circuit breaking device, such as relay $b$ may be utilized to stop pump 127.

Interposed across pressure and discharge liquid lines, is a reversible micro pump 141 under the control of a reversing starter $k$. Communicating with the micro is a normally closed quick-acting valve 142, operable by a solenoid energized in common with the micro pump motor. An alleviator 143 absorbs surges from the pump and valve 142, in one direction, and an alleviator 144 handles surges from the other direction, including surges of valves 133 and 134. The micro pump, in this assembly, forms a liquid flow reversing unit operable to actuate cylinders 48 in normal or reversing "creeping" speeds. Upon the delivery of liquid from the discharge to the pressure side, the resulting disturbance of the relative pressure balance in cylinders 48 effects movement of the elevator at "creeping" speed. By a reversal of the micro pump, transferring liquid from the pressure to the discharge side, a corresponding reversal of flow through the cylinders will result in speed and directional variations of the elevator movement. The directional shifting of flow through the micro pump may be governed by a micro switch $m$.

*The electrical control system*

The invention contemplates an electrical control system to govern the operation of the elevator, transfer devices and conveyors whereby to synchronize their functions in substantially automatic actuation. A control system to which the invention may be applied is exemplified by the schematic diagram of circuits and devices associated therein shown in Figs. 28 and 29.

The switches, starters and relay devices, shown generally in normal contact positions, are electrically connected through a positive and negative bus energized from a series of normally closed cut-off switches $n$ located in proximity to the elevator hatchways on each floor. Direct current, preferably utilized in this control, may be taken from a conventional motor-generator set $mg$, governed by a starter $m'g'$. Conveyor and transfer devices hydraulic circuits are energized from switch $a''$. The elevator hydraulic circuit is energized from switch $b'$.

The elevator is started by closing magnetically held relay $f$ which is connected to the solenoid of valve 133 to effect its opening, and to time-delayed opening relay $g$ functioning through relay $h'$ to actuate the solenoid of valve 137 to effect its closing. Relay $f$ is also connected to close magnetically held relay $d$, thus effecting the opening of valve 134. With valves 133 and 134 open and valve 137 closed, the flow is directed to cylinders 48 to motivate the elevator.

An important feature of this control resides in the adaption thereto of photo-electric cell operated circuits which are affected by the individual vehicles while in transit, so as to synchronize the functions of the conveyor, elevator and transfer devices.

Across the ascending and descending hatchways and adjacent each floor level, is directed a light beam which affects its corresponding photo-electric cell upon the breaking of this beam by a vehicle occupying a carrier upon its approach to floor level. Unloading platforms 54, serving the ascending carriers, are likewise provided with photo-electric cells, each positioned so as to receive a light beam which is breakable by a vehicle occupying the unloading platform. By an arrangement of relay devices responsive to the photo-electric cells, through circuits to be presently described, the hatchway and unloading platform light beams govern the operation of the elevator and transfer devices associated therewith so as to prevent the discharge of a vehicle from an ascending carrier arriving at an unloading platform not yet clear of the vehicle previously deposited thereon. In like manner, hatchway beams of the descending side govern relay devices which control the elevator and transfer devices of loading platforms 55 so as to prevent the shifting of a vehicle occupying a loading platform onto a descending carrier already loaded.

The entrance conveyor 14, pedestrian conveyor 20, and overhead strap conveyor 21 have electric motor drives (not shown) which are started by a switch $q$ having a pull cord reachable by an attendant functioning in proximity thereto. This switch governs a motor starter $q'$ controlling these conveyor drives. Starter $q'$ has a supplemental connection for energization through a relay $q''$ which is operable preferably by a vertically disposed light beam projected toward a photo-electric cell so positioned as to effect the breaking of this beam by a vehicle approaching the junction of entrance conveyor 14 with transfer belts 15. A second similar light beam is projected toward a photo-electric cell so positioned as to effect the breaking of the beam by a vehicle when its rear wheels have cleared the entrance conveyor and are resting on belts 15 and idler roll 16. This beam affects relay Q to energize magnetically held relay $s$ which controls the solenoid of valve 122 actuating hydraulic motor 34 to drive transfer belts 15. Switch $q$ is connected in circuit with the two photo-electric cells, hereinbefore described, in such manner that the simultaneous interruption of the two beams governing relays $q''$ and Q inactivates this switch, thereby rendering conveyor 14 inoperative to deliver a vehicle to the transfer belts if they are already occupied by a vehicle moving to the elevator for transfer thereto.

The bumper switch shown in Fig. 4 and designated $s'$ in Fig. 28 is actuated when the vehicle is carried by the transfer belt 15 to a position thereon in alignment with the carrier 39, to close relay $t$ which is connected, in turn, to open relay $s$ so as to arrest the transfer belts. Thus, these belts are governed by the vehicle in transit thereon to become inoperative upon the registration of the vehicle with a carrier for transfer thereto.

All the transfer devices respond to relay devices designated TR.

On the receiving floor, the TR relay which governs the transfer device loading incoming vehicles from transfer belts 15 is controlled by relays $t$ and $t'$, responsive to the light beam transecting the ascending hatchway at this floor. Light beams, transecting the ascending hatchway at the storage floor levels, affect relays $u$ and $u'$. Light beams projected across unloading platforms 54 govern relays $y$ and $y'$ to render inoperative the transfer devices serving these platforms when loaded, at the same time inactivating a switch $v$ for a purpose to be presently explained. Light beams transecting the descending hatchway govern relays $w$, $w'$ and $w''$.

TR relays controlling transfer devices serving platforms 55 on the descending side are governed by relays $aa$, $w$, and $j$, $w'$, responsive to momentary push button switches $c$ which are located for the convenience of attendants, to be closed when a vehicle destined for the receiving floor has been spotted on these platforms.

TR relays, controlling transfer devices unloading the carriers of the ascending flight, are energized through relays $u$ and $y$ on intermediate storage floors, and through relays $u'$ and $y'$ on the topmost storage floor.

The transfer devices circuit has a negative load, designated P, energized by relay $d$ when open, and energizing a momentary time-delayed relay $m'$ as well as micro pump switch $m$. From switch $m$, lead P follows through as a common bus to all relays governing the transfer devices, including relay $z'$.

Assuming a vehicle, positioned on transfer belts 15 for transfer therefrom, has closed bumper switch $s'$: lead P runs through contacts in relay $t$, thence to relay $t$, now closed by switch $s'$. The TR relay is closed to energize the negative lead to the solenoid of the valve actuating cylinder 69, opening switch B to prevent the opening of valve 122.

Upon the extension of the transfer device, switch F opens to open the TR relay through the breaking of the positive lead to its holding coil. This relay is kept from re-closing by the delivery of the vehicle upon the carrier, in the course of which relay $t'$ was opened, thereby opening line P and closing line G which closes relay $f$ when all B switches are closed.

Line G connects all B switches on the descending side including relay $w''$ so as to prevent the start of the elevator until the bottommost carrier has been unloaded. Line G extends, also, from relay w'' through all B switches on the ascending side including relay u' to prevent the start of the elevator until the topmost carrier has been unloaded. Line G extends by a common lead from relay u' to one side of contacts in relay w, w't' and u; the other side of these contacts have a common lead to the negative side of the holding coil in magnetically-held relay f. Thus, one or more of relays t', u, w and w' are operative to close the starting circuit when a vehicle occupies a carrier to break the pertinent light beam thereacross. Relays u' and w'', if in open position, prevent the elevator from starting.

Elevator deceleration control

The hatchway has arranged therein a pair of vertically alined contact switches v and v', shown diagrammatically in Fig. 28, having spring-held contact arms which are engageable by contact rollers 47 (Fig. 11), mounted on the carriers. Switch v is connected so as to open the stop circuit line R, a normally closed positive lead to the holding coil of relay f. Stop valve 134 will not close, however, as switch v' keeps relay d closed until the contact roller 47 has opened switch v' which is positioned so as to function when the carriers have registered with floor levels.

Switch v' keeps a negative lead energized to the holding coil of relay d when that device is closed. A third contact switch m of conventional toggle type, may be included in this assembly for engagement by contact rollers 47 upon failure of a carrier to stop, for any reason, at the desired floor. Switch m with relay d open, would close starter k to effect a slow reversal of the elevator to its normal stop position, by virtue of the micro pump thus brought into operation. This circuit includes a time-delayed relay m' operative to retard the closing of line P to switch m so as to prevent this lead from energizing the transfer device until the elevator has been brought to its proper stop position.

Line R has interposed therein a magnetically-held relay z which is closeable by a time-delayed relay z', to prevent the re-closing of relay f, following the opening of line R by switch v (under the influence of roller 47), until the elevator has been properly arrested and one or more transfer devices have functioned to open one or more of the B switches. Thus, when line R is de-energized, relays z and f will open and remain open until line P is energized at relay z' closing relay z during the functioning of the transfer device.

Upon the approach of a loaded ascending carrier to a floor on which the unloading platform is obstructed by a vehicle discharged from a preceding carrier, relay u will open the stop circuit. Line R is normally a closed circuit by-passing slow-down switch v. This line is a positive lead from the load side of switch v and runs in parallel series through relays u'—y'; again in parallel series through relays u—y; series through t—w''; parallel series through relays j—w'; in series through relay aa to the positive bus. These relays are operative by their respective controls to open line R. Relays affected by hatchway light beams are operative when switch v is open as the carrier approaches floor level to open relay f, resulting in the interruption or continued travel of the elevator.

Thus, for example, with switch v momentarily opened by roller 47, and a carrier-borne vehicle having opened relay u, and circuit R therethrough, but a vehicle obstructing the adjacent unloading platform has opened relay y to keep circuit R closed so as to bypass switch v, the elevator cannot stop unless affected by other relays in circuit R. The carrier-borne vehicle will continue its ascent until arrival at a storage floor having a vacant unloading platform, whereupon the pertinent relay u will function to open circuit R so as to permit actuation of switch v.

Should other controls in a remote part of the sytem effect the stoppage of the elevator simultaneously with the arrival of a vehicle-laden carrier at an obstructed unloading platform circuit P being energized, then relay u will close circuit P to relay Y, resulting in circuit P being kept open to render inoperative the transfer device serving with this platform.

Referring now to the descending side, a vehicle having been spotted on a loading platform for descent to the exit floor, an attendant pushes, momentarily, switch c to close relay aa, opening line R and closing line P to the TR relay. Engagement of roller 47 with switch v stops the elevator; line P being now energized, relay TR is closed to motivate the transfer device, which shifts the vehicle to the carrier and opens switch B. The delivery of the vehicle onto the carrier now opens relay w, closing line G and opening line P in advance of the closing of switch B. The transfer device has opened switch F and relay TR, permitting retraction of the transfer device, closing switch B and starting the elevator.

Assuming the vehicle to have been spotted for descent to the exit floor, the attendant having pushed switch c as above described, but the carrier approaching from above is already vehicle-laden: switch c closed relay j thereby opening line R and closing line P. On approaching floor level, the vehicle occupying the descending opens relay w'. Switch v being momentarily open, line R is kept closed by relay w' permitting the laden carrier to continue in descent past the floor unless the elevator should be arrested by other devices functioning in remote parts of the system.

Upon the approach of a descending laden carrier to the receiving floor, the elevator is stopped by the opening of line R responding to relay w''. Relay x now becomes operative to effect the unloading of the vehicle onto transfer belts 112 if this belt be clear. Line P is kept normally closed by relay x to relay w' if belts 112 are clear but relay x is open in response to the presence of the vehicle on belts 112 so as to prevent the closing of relay TR and at the same time actuate belts 112. When the transfer device is actuated, switch B is opened to open Line G and also a negative lead from relay x to the solenoid of valve 123, to prevent actuation of belts 112 while the transfer device is in operation.

Relay x is opened with the discharge of the vehicle from the carrier, opening line P and closing a negative lead to valve 123 which does not, however, close until the transfer device retracts to normal position, thereby closing switch B and actuating transfer belts 112 to advance the vehicle to exit conveyor 113. When the vehicle has cleared belts 112, relay x re-closes, closing valve 123 and line P. Should the rear of the exit conveyor 113 be occupied by a vehicle, a light beam transecting this conveyor and directed to a photoelectric cell will be broken thereby, affecting relay x', to open and opening the positive bus to valve 123 so as to arrest movement of belts 112. This light beam transects the exit conveyor 113 about one car length ahead of the junction thereof with transfer belts 112. Should transfer belts 112 be occupied by a vehicle, relay x will be affected by a light beam directed to a photo-electric cell and transecting belts 112, and this relay will remain open to prevent the inadvertent operation of the transfer device in response to the arrival of a succeeding loaded carrier. At the same time, the elevator is prevented from starting by relay w'' which opens line G in response to the presence of the vehicle on the carrier.

Operation of exit conveyor 113, together with pedestrian conveyor 114 and overhead grip strap conveyor 21, is initiated by a pull chain switch similar in function to switch q and connected through a motor starter r' to electric motor means (not shown) driveably associated with these conveyors.

The elevator is operable at reduced, or "creeping" speed in either direction by application of the micro pump hereinbefore described, for the purpose of making repairs, adjusting controls, and the like. Momentary push button switches $i'$ and $i$, for normal or reverse directional movement, may be positioned near elevator hatchways on each floor, convenient to safety switch $n$. These switches open the control bus to permit workmen to move in safety while manipulating switches $i'$ and $i$.

*Floor isolation control*

The control system may include a suitable "cut-out" circuit for the purpose of isolating from operation such top floors as may not be needed by demand on the parking system. This circuit employs a 3-way manual switch L, interposed in line G for the downward routing thereof to a 3-way manual switch L', and thence through relay $u$, whereby to prevent the elevator from moving a laden carrier above the floor on which switch L' is located. The first storage floor above the entrance floor may be isolated for the purpose of using it for repairing, washing and greasing of automobiles. To send a vehicle to this isolated floor, the attendant at the receiving floor will turn on the headlights of the vehicle. Upon the approach of the vehicle on the carrier to this floor, the vehicle will break the beam of the photo-electric cell $u$ thereby opening the circuit R (see Fig. 29) and stopping the elevator at this floor. An additional photo-electric cell $nn$ is so located that it is energized by the headlights of the vehicle as the carrier arrives at floor level. This opens bus $g$, thereby ceasing operation of the elevator until such time as this vehicle is unloaded from the carrier. When the unloading platform 51 is vacated of any vehicles, headlights of the vehicle on the carrier will energize the photo-electric cell $nn$, closing the transformer bus P through the photo-electric cell operated relay $y$, which in turn closes transfer relay TR thereby causing the transfer device to unload the vehicle.

Line G will remain open until the vehicle is unloaded. The operation of the elevator will be delayed until line G is reclosed by the relay responsive to cell $nn$. Thus, the operation of the photo-electric cell in the manner herein described provides an automatic selective means for the routing of a vehicle to a designated floor.

The invention is thus seen to provide a mechanized parking garage of characteristics unique in the development of metropolitan parking facilities. By virtue of the endless chain elevator therein employed, the garage is capable of receiving a reasonably continuous stream of vehicles and the association of the vehicle conveyor belts with the elevator provides an orderly and expeditious feed of the incoming cars thereto and their reclamation therefrom.

The diversion of incoming and outgoing traffic through underpass access and exit ways connecting the receiving floor with the street serving the garage not only eliminates a hazard to sidewalk pedestrian traffic, but releases the street floor for use to commercial purposes such as stores, offices and the like. By this construction, the street floor may be utilized as an arcade, access thereto being provided through a main entrance door fronting the street and a rear stairway communicating with the receiving floor. Thus, patrons entering the building via the vehicular underpass to deliver their cars to the parking system would be directed to the street floor via the rear stairway and progress toward the street entrance through the arcade. Patrons seeking to reclaim their vehicles would enter the street entrance 5, moving through the arcade to the rear stairway for access to the receiving floor. By this arrangement, businesses occupying the arcade would be afforded the benefit of a flow of pedestrian traffic moving therethrough in its course of parking and reclaiming of cars, thereby enhancing the commercial value of the property housing the garage.

The employment of underpass approaches with my endless chain elevator to receive and hoist vehicles to the storage floors will thus be seen to constitute an improvement in mechanized parking garages by virtue of the compact arrangement of building space effected thereby.

The invention may thus be practiced in application to department store, office and theater buildings, or the like, affording to patrons thereof parking facilities convenient to their business pursuits. By virtue of the vehicle-actuated light-sensitive circuits employed to govern the controls for the elevator, transfer devices and conveyor assemblies, the invention achieves substantially automatic starting and stopping sequences in their operation. All vehicle carriers serve the several floors of the garage and are loaded or unloaded in simultaneous operation.

It is to be understood that I may omit the entrance and exit conveyor assemblies, pedestrian belts and overhead grip strap conveyors, moving the vehicles under their own power between the transfer belts and the access and exit rampways, or I may omit the transfer belts with the foregoing mechanisms and move the vehicles under their own power directly to and from suitable platforms adjacent the elevator flights, without departing from the essential spirit of my invention.

The endless chains may be replaced, if desired, by flexible cables, band-metal structure or like supporting members for the carrier assemblies. The invention is further applicable to the handling of cargo other than vehicles, insofar as the mechanisms thereof are employable therewith.

While the invention is herein exemplified as a hydraulic-driven system, prime movers of other conventional types may be employed and suitable modifications to the control system be effected within the knowledge of those skilled in the art.

Of course, the invention is susceptible of various modifications without departing from the scope thereof, as hereinafter claimed.

What I claim as new is:

1. In a mechanized parking garage having a plurality of superposed floors and an elevator serving said floors, a carrier arranged in said elevator, a vehicular conveyor to serve said elevator and discharging beside said carrier, means to drive said elevator and control means therefor, means to drive said conveyor and control means therefor, a vehicle transfer device associated with said carrier for the loading of a vehicle thereon and means to actuate said transfer device, switch means engageable by said vehicle and operatively connected to said elevator driving means control, said conveyor driving means control, and said transfer device actuating means whereby to inactivate said elevator driving means and said conveyor driving means and to actuate said transfer device, upon the arrival of said vehicle into registry with said carrier.

2. In a mechanized vehicle receiving structure, a first endless-conveyor and a second endless-conveyor extending in endwise alinement therewith for the reception of a vehicle delivered thereto by said first conveyor, an idler roll interposed intermediate said conveyors and adapted to support the rear wheels of said vehicle upon the discharge thereof from said first conveyor, a pedestrian endless belt mounted alongside said first conveyor, an overhead trolley rail mounted above said pedestrian belt, an endless conveyor mounted on said trolley rail and having a plurality of grip straps suspended therefrom, and power operated means for synchronizing the movements of said first conveyor, pedestrian belt and said overhead grip strap conveyor.

(References on following page)

References Cited in the file of this patent

UNITED STATES PATENTS

| | | |
|---|---|---|
| 1,848,102 | Blair | Mar. 8, 1932 |
| 1,871,372 | James | Aug. 9, 1932 |
| 1,896,021 | Taylor | Jan. 31, 1933 |
| 1,949,964 | Keller et al. | Mar. 6, 1934 |
| 1,955,959 | Harnischfeger et al. | Apr. 24, 1934 |
| 1,969,002 | Gleichman | Aug. 7, 1934 |
| 1,985,563 | FitzGerald | Dec. 25, 1934 |
| 2,130,323 | Lueckel | Sept. 13, 1938 |
| 2,304,447 | Feusier | Dec. 8, 1942 |

FOREIGN PATENTS

| | | |
|---|---|---|
| 666,699 | France | May 28, 1929 |
| 502,984 | Great Britain | Mar. 29, 1939 |